United States Patent [19]
Ott et al.

[11] 3,750,466
[45] Aug. 7, 1973

[54] DEVICE FOR MEASURING THE TENSION OF EXTENDED FLEXIBLE MATERIALS

[75] Inventors: William C. Ott, Westmount; Leo Paul Dionne, Trois-Rivieres, both of Quebec, Canada

[73] Assignee: Niagara Wire Weaving Company Limited, Niagara Falls, Ontario, Canada

[22] Filed: Dec. 29, 1971

[21] Appl. No.: 213,578

[52] U.S. Cl. .................................................. 73/159
[51] Int. Cl. .......................................... G01m 33/36
[58] Field of Search ...................... 73/95, 95.5, 143, 73/144, 159, 81

[56] References Cited
UNITED STATES PATENTS
3,296,857   1/1967   Kaczens ................................. 73/159
3,200,640   8/1965   Ernst ....................................... 73/81
FOREIGN PATENTS OR APPLICATIONS
115,338   5/1918   Great Britain ......................... 73/144

*Primary Examiner*—James J. Gill
*Attorney*—John C. Holman et al.

[57] ABSTRACT

A device for measuring the tension of extended flexible materials is disclosed, the device comprising a substantially circular ring member having a handle assembly slidably connected thereto for axial movement towards and away from the ring member. Resilient biasing means such as compression springs are disposed between the ring member and the handle assembly for resisting the axial movement. Pressure sensing means are disposed for axial movement with the ring member for thereby measuring the amount of pressure to which it is exposed upon thrusting of the device against an extended flexible material. During such thrusting of the device and upon a predetermined axial movement of the handle assembly relative to the ring member, brake means are actuated by the handle assembly for restraining the pressure sensing means against further movement to thereby deactivate same. The device is capable of measuring the tension of extended flexible materials irrespective of the angle, position, or pressure at which it is thrust upon the material, and further, the device is capable of taking readings even in an upside-down or inverted position.

6 Claims, 5 Drawing Figures

PATENTED AUG 7 1973
3,750,466
SHEET 1 OF 2
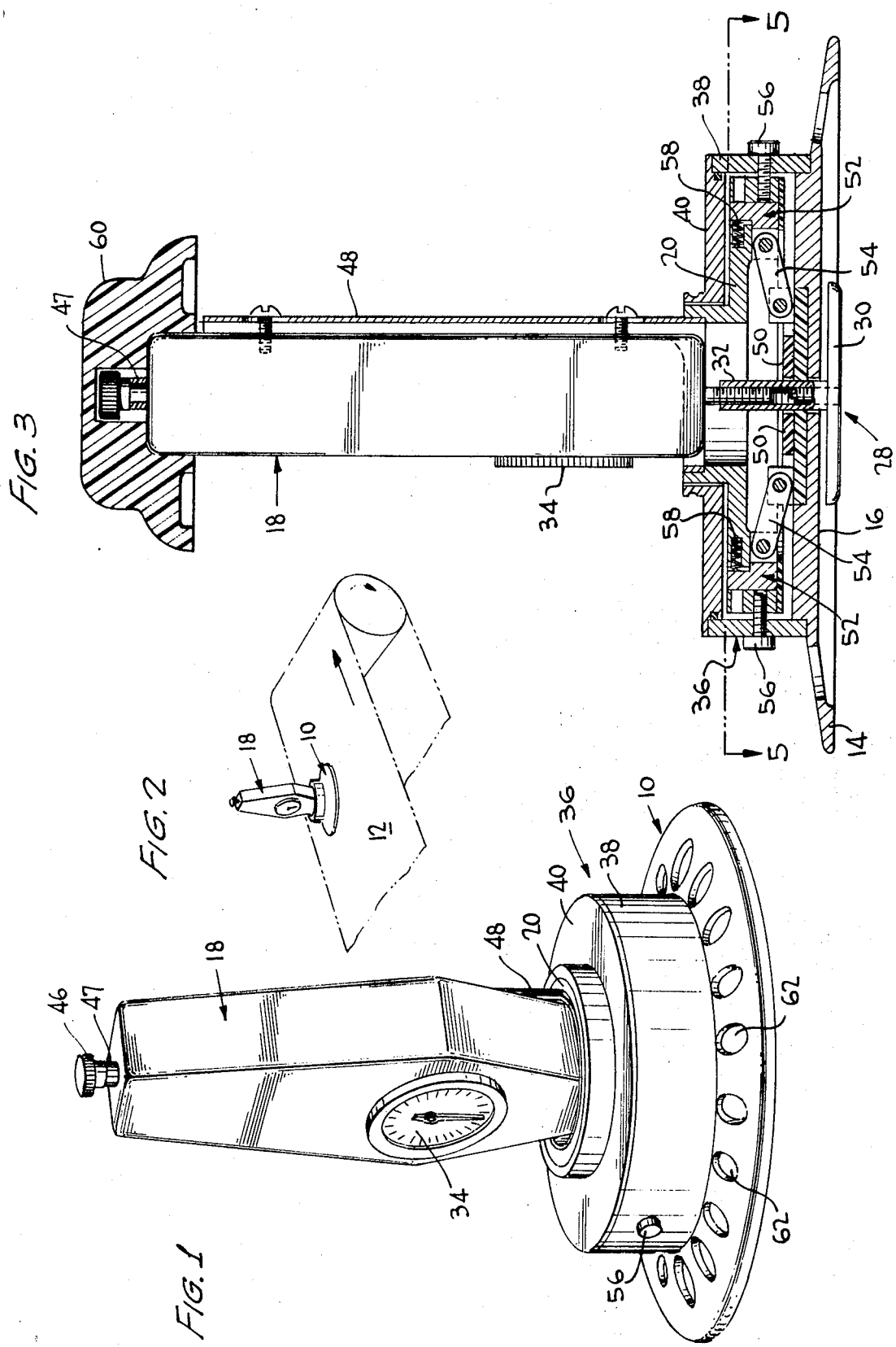

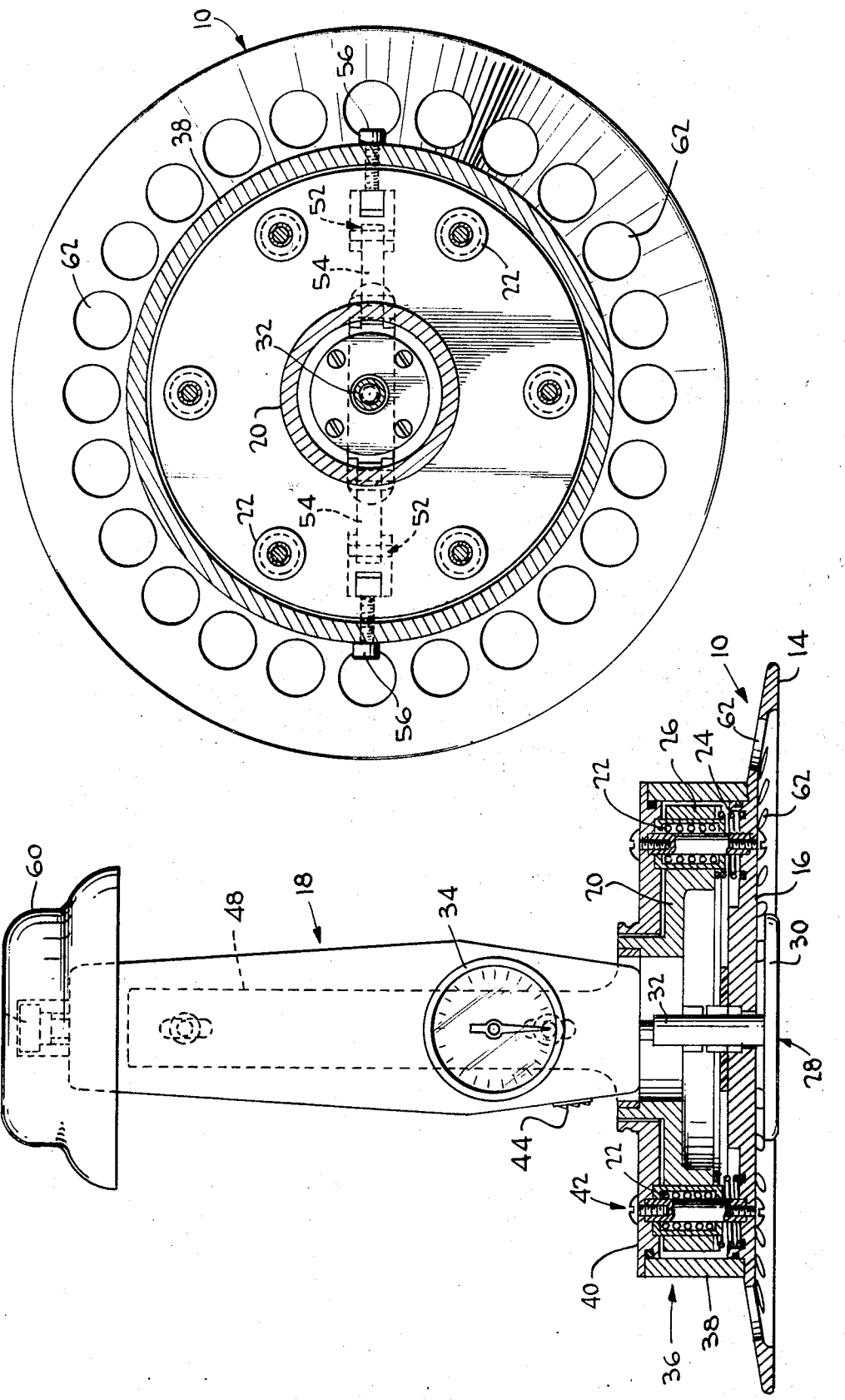

DEVICE FOR MEASURING THE TENSION OF EXTENDED FLEXIBLE MATERIALS

This invention generally relates to tension measuring devices and particularly concerns a device for measuring the tension of extended flexible materials such as a wire, cloth, or paper web.

It oftentimes is necessary during the processing of extended flexible materials to ascertain the tension under which the flexible material is maintained. For example, too much tension in a running web of flexible material such as plastic might overly stress and stretch same, thereby deleteriously affecting the finished product. On the other hand, too little tension in a web of cloth, for example, might cause the cloth being wound to wrinkle. In paper making processes where webs of wire mesh screens are utilized, maintaining the proper tension of such screens is critical.

In view of the necessity of ascertaining the tension of extended webs of flexible material, many tension measuring devices have been developed in the prior art. The most typical of such devices measured the tension of flexible material suspended or extended between a pair of rollers by initially measuring the resistance of the material to deflection from a normal position upon the application of a deflecting force, with the resistance value being related to the tension of the material in accordance with well-known tables for the given material. Of course, with such measurements, it is necessary to exclude the affect of the deflecting force applied to the web itself since, unless this deflecting force applied by the measuring instrument is compensated for, the resulting reading would be erroneous. It is for this reason that most of the prior art tension measuring devices comprise fixed apparatus which are only suitable for use in measuring the tension of an extended web of flexible material at one given point thereof.

Yet, the art has developed to the point wherein it is now possible to measure the tension of an extended web of flexible material by utilizing a portable apparatus of known type, wherein the force with which the portable apparatus is thrust against the web is automatically compensated for and removed from the deflection reading results. The development of such portable instruments constituted a marked breakthrough in this art. However, further development is still needed since the portable instruments in use today still have severe limitations with respect to their operation. For example, known portable instruments must be thrust against the extended flexible web in a flush or flat manner and not an angle thereto. Otherwise, the force compensating feature of such instruments as above-described are not highly effective. Furthermore, and so as to compensate for such affects as "cross-machine tensions," prior art portable tension measuring devices had to be carefully positioned on the extended flexible material, thereby increasing the time necessary for obtaining a reading.

With this background in mind, it is apparent that a specific need still exists in this art for a portable tension measuring device which does not exhibits the disadvantages of prior art devices as above-discussed. It is the primary objective of the instant invention to provide such an improved tension measuring apparatus.

A further object of the instant invention is the provision of a device for measuring the tension of extended flexible materials, which device is capable of giving accurate readings of tension at any given location on the web and at any angle or position of contact with the web.

A still further object of the instant invention concerns the provision of a device for measuring the tension of extended flexible materials, which device is capable of operating accurately in an upside-down or inverted position whereby means are provided to offset the effect of gravity.

A still further objective of the instant invention concerns the provision of a portable tension measuring device wherein accurate and true readings of tension of an underlying web of flexible material can be taken regardless of the pressure with which the device is thrust against the web.

These objects as well as others which will become apparent as the description proceeds are implemented by the instant invention which, as aforestated, comprises an improved device for measuring the tension of extended flexible materials, such as a wire mesh web. The device comprises a substantially circular ring member which initially makes contact with the underlying web. A handle assembly is slidably connected to the ring member for axial movement relative thereto, a resilient biasing means such as a plurality of springs being disposed between the ring member and the handle assembly for resisting the axial movement. Pressure sensing means are further disposed for axial movement within the ring member to thereby measure the amount of pressure to which it is exposed upon thrusting of the device against an extended flexible material. Finally, brake means are provided for restraining the pressure sensing means against further movement to thereby deactivate same, the brake means being actuated by the handle assembly upon predetermined axial movement of the handle assembly relative to the ring member.

The apparatus is contemplated to be held by the user thereof and thrust upon or against an extended web of flexible material. Due to the substantially circular construction of the ring member which makes contact with the web, the angle upon which the device is thrust, or the position of the device relative to the run or length of the web, does not adversely affect the ultimate pressure reading. Simultaneously with the contact between the circular ring member and the underlying web of flexible material, contact is made with the pressure sensing means, the pressure sensing means thereby measuring the amount of deflection of the web as a direct function of the axial movement of the pressure sensing means. As the device is further pressed against the web, a certain point will be reached, i.e., a predetermined axial movement of the handle assembly relative to the ring member will occur, at which the thrusting pressure applied against the web reaches a predetermined value. At this point, the braking means are actuated so as to effectively deactivate the pressure sensing means and "freeze" or fix the deflection reading. Thus, in its broad approach, the instant invention comprises a device which applies a controlled pressure to an underlying extended web of flexible material, the device accurately recording the differential in deflection of the web created between the ring member which applies the controlled force, and the pressure sensing means which measures the deflection.

The invention will be better understood and further advantages and features will become apparent from the following detailed description of a preferred inventive embodiment, such description making reference to the appended sheets of drawings, wherein:

FIG. 1 is a perspective illustration of the novel tension measuring device of the instant invention;

FIG. 2 is an illustration of the utilization of the tension measuring device of FIG. 1 upon an underlying extended web of flexible materials;

FIG. 3 is an elevational view, partially in section for illustrative clarity, of the tension measuring device depicted in FIG. 1;

FIG. 4 is a further elevational view, partially in section for illustrative clarity, and turned 90° from the view of FIG. 3; and FIG. 5 is a top plan view of the tension measuring device of the instant invention, taken in section along lines 5—5 of FIG. 3.

Throughout the several views of the drawings, like parts have been designated by the same reference numeral.

Referring now the drawings, the novel tension measuring device of the instant invention will be seen to comprise a substantially circular ring member generally designated by the reference numeral 10, the ring member defining a stabilizer ring for applying force to an underlying extended web of flexible material 12 as in FIG. 2 in the manner to be described. As depicted in FIGS. 3 and 4, the stablizer ring 10 has a flat undersurface 14 adjacent the periphery thereof for contact with the extended flexible material, and a hollow, concave interior section 16.

A handle assembly generally designated by reference numeral 18 is slidably connected to the ring member 10 for axial movement relative thereto. Specifically, and in the preferred inventive embodiment, the handle assembly 18 is rigidly connected to a collar 20 which is journalled for sliding movement in a plurality of bearings 22 disposed about the periphery of the collar. In the embodiment as shown, six such bearings are illustrated as is depicted in FIG. 5. Resilient biasing means, such as compression springs 24 are disposed between the ring member 10 and a downwardly depending flange 26 of the collar 20 attached to the handle assembly 18. The compression springs 24 are circumferentially spaced about the circular ring member 10 underneath each of the bearings 22, as shown. Thus, when the handle assembly 18 is depressed in a downward direction as viewed in the various Figures, the collar means 20 will further compress the compression springs 24 to apply a controlled pressure to the member or stabilizer ring 10.

A pressure sensing means generally designated by reference numeral 28 is axially aligned with the ring member 10 and is preferably disposed within the hollow, concave interior section 16 thereof, pressure sensing means 28 comprising a disc 30 coupled by means of an elongated connecting rod 32 to an indicator dial 34 disposed on the handle assembly 18. The disc 30 is slidably disposed within the stabilizer ring 10 so as to be capable of movement in an axial direction, the amount of such movement being transmitted via the connecting rod 32 to the dial 34, whereat the movement is translated into a pressure indication.

A cylindrical housing generally designated by reference numeral 36 is attached to the top side of the stabilizer ring 10 and will be seen to comprise vertically upstanding cylindrical side walls 38 and an annular top portion 40. Connecting bolt means 42 secure the housing 36 to the stabilizer ring 10, and further secures the bearing means 22 and the underlying springs 24 in proper position.

As above-discussed, axial movement of the pressure sensing disc 30 is transmitted via the elongated connecting rod 32 to be read on dial 34. Dial indicator 34 can be of any well-known type, such as is used in prior art portable tension measuring devices wherein the indicator will be automatically maintained at its highest reading during any given measurement through actuation of a control button 44. Resetting of the dial indicator 34 can be effected, in known fashion, through a depression of the control button 44 whereas, if so-called "floating" operation of the dial indicator is desired wherein the indicator always reads the instantaneous pressure or axial movement of the disc 30, the control button 44 can be displaced into still another operative position as is known. The dial of dial indicator 34 can be set to any desired "zero" through manipulation of an adjusting screw 46, as is conventional. It should further be recognized that the elongated rod 32, as depicted in FIG. 3 of the drawings, is itself adjustably mounted or attached to the pressure sensing disc 30 and the effective length of such connecting rod can still further be adjusted through vertical adjustment of the position of the handle assembly 18 itself, about a supporting plate 48.

With the arrangement as so far described above, it is possible to take measurements of the tension of an extended web of flexible material simply by thrusting the device against the material so that the stabilizer ring 10 lies in contact thereagainst, and subsequently measuring the amount of deflection of the flexible material as a correlation of the amount of vertical movement of rod 32. Yet, such a device would still suffer from the disadvantage discussed at the outset whereby it would be impossible to compensate the deflection reading for the amount of deflecting force applied by the measuring device itself against the flexible material. It is for this reason that the device of the instant invention incorporates a novel construction of a braking means for the pressure sensing means 28 as will be discussed with particular reference to FIG. 3 of the appended drawings.

Specifically, the instant invention contemplates the provision of brake means which will deactivate the pressure sensing means 28 when a predetermined amount of force is applied by the stabilizer ring 10 against the underlying web of flexible material. Stated in other words, braking means are provided which will be actuated to restrain the elongated rod 32 against further axial movement upon the occurence of a predetermined axial movement of the handle assembly 18 relative to the underlying stabilizer ring 10. As should be appreciated, when the handle assembly 18 is moved axially downward toward the stabilizer ring 10, springs 24 are compressed thus applying an increasing force to the stabilizer ring 10, which force is, of course, transmitted to the underlying web. Thus, and since the compression springs 24 provided generally apply a resisting force in a manner which is linearly related to the amount of compression, when the handle assembly 18 reaches a predetermined point of axial movement, a predetermined amount of force is at that time applied to the underlying web through the stabilizer ring 10, and the brake means are then actuated to deactivate the pressure senser.

In this respect, the preferred embodiment incorporates a plurality of friction brake shoes 50 which encircle the elongated connecting rod 32 of the pressure sensing means 28. The brake shoes 50 are radially slidable into the connecting rod 32 so as to clamp same upon predetermined axial movement of the collar 20 rigidly attached to the handle assembly 18. In this fashion, the pressure sensing means 28 and specifically the elongated rod 32 thereof is restrained against further movement.

The structural details of the brake means will be seen to include adjustable guide mechanisms generally designated by reference numeral 52 which are fastened to the collar 20 and which are coupled to the brake shoes 50 via a connecting linkage 54. The rate of operation of the brake means of the instant invention is controlled by external adjusting screws 56 and the brake means are further provided with compression springs 58 which insure proper seating of the shoes 50. With the construction of the brake means as above described, it will be seen that as the collar 20 moves downwardly in the axial direction toward the underlying stabilizer ring 10, the connecting linkage 54 will serve to convert such downward axial movement into a radially inward movement of the brake shoes 50 so as to clamp the connecting rod 32.

In the preferred example of the invention, a rubber or plastic cap 60 as depicted in FIGS. 3 and 4 is adapted to be placed over the top of the handle assembly 18 so as to provide a ready means for gripping the instrument and to further serve as a safety device protecting the indicator dial adjusting screw 46. Additionally a spacer guage 47 is incorporated to predetermine, set and return dial indicator 34 needle to zero. Additionally, and if desired, the overall weight of the tension measuring device of the instant invention can be somewhat reduced by the drilling of a plurality of apertures 62 about the periphery of the stabilizer ring 10.

In operation, and assuming that the device of the instant invention is to be thrust downwardly into an underlying web 12 of flexible material as depicted in FIG. 2, the indicator dial 34 would first be adjusted so as to compensate for the weight of the device itself. The device would then be thrust into the underlying web 12 at any angle relative thereto and at any position thereon, the substantially circular shaped stabilizer ring 10 insuring accurate subsequent measurements. As downward pressure is applied by the operator of the device through the handle assembly 18, the handle assembly 18 and specifically the guide collar 20 attached thereto will move in an axially downward direction toward the stabilizer ring 10, thereby compressing the springs 24 and applying a controlled force to the underlying web 12 through the stabilizer ring 10. Simultaneously, the deflection which would occur in the underlying web 12 operates as a pressure upon the pressure sensing means 28 and causes the elongated rod 32 attached thereto to move axially upwardly so as to operate the indicator dial 34. When the amount of force applied to the underlying web 12 reaches a predetermined controlled level or, more specifically, when the handle assembly 18 is depressed downwardly toward the stabilizer ring 10 a predetermined distance, the adjustable guides 52 for the brake means attached to the collar 20 serves to slide the brake shoes 50 radially inwardly via linkage means 54 so that the brake shoes clamp the elongated rod 32 and prevent any further movement thereof, thus deactivating the pressure sensing means 28. The amount of deflection of the underlying web 12 is related to its tension and is read as a pressure on the dial indicator 34 at that time. If the control button 44 for the dial indicator 34 had previously been placed in its "locked" position, the pointer of the dial indicator 34 would maintain its maximum reading so that when the tension measuring device was withdrawn, such maximum reading could easily be ascertained.

The same operation as above-discussed occurs when the tension measuring device of the instant invention is thrust upwardly against the underside of an extended flexible web. In this case, however, the zero setting of the indicator dial would have to be set so as to compensate for the lack of weight of the device against the web.

It should be apparent from the foregoing detailed description that the objects set forth hereinabove have been successfully achieved. Moreover, while there is shown and described present preferred embodiments of the invention, it is to be distinctly understood that the invention is not limited thereto but may be otherwise variously embodied and practised within the scope of the following claims. ACCORDINGLY, The embodiments of the invention in which an exclusive property or privilege is claimed are defined as follows:

1. A device for measuring the tension of extended flexible materials comprising:
   a substantially circular ring member;
   a handle assembly slidably connected to said ring member for axial movement relative thereto;
   resilient biasing means disposed between said ring member and said handle assembly for resisting said axial movement;
   pressure sensing means disposed for axial movement within said ring member for thereby measuring the amount of pressure to which it is exposed upon random thrusting of said device against an extended flexible material;
   brake means actuated by said handle assembly upon predetermined axial movement of said handle assembly relative to said ring member for restraining said pressure sensing means against further movement thereby deactivating same; and
   an indicator dial disposed within said handle assembly;
   said pressure sensing means being coupled to said indicator dial by means of an elongated connecting rod;
   said resilient biasing means comprise a plurality of compression springs circumferentially spaced about said circular ring member and said handle assembly;
   said handle assembly including a collar disposed coaxially with respect to said ring member and rigidly connected to an elongated handle, bearing means disposed about said collar for slidably journalling said collar therein; and said plurality of springs being disposed between said ring member and said collar, axially downward movement of said handle toward said ring member thereby compressing said springs to control the force applied to the extended flexible material when said device is thrusted thereagainst.

2. A device as defined in claim 1, wherein said brake means comprise friction brake shoes encircling said elongated connecting rod of said pressure sensing means, said brake shoes being radially slidable into said connecting rod to clamp same upon predetermined axial movement of said collar relative to said ring member.

3. A device as defined in claim 2, further including adjustable linkage means between said collar and said brake shoes for converting axial downward movement of said collar into radially inward movement of said brake shoes.

4. A device as defined in claim 3, wherein said ring member has a flat undersurface adjacent the periphery thereof for contact with the extended flexible material, and a hollow, concave interior section, said pressure sensing means comprising a disc disposed within said concave interior section.

5. A device as defined in claim 4, wherein said indicator dial includes control means for selectively releasing and maintaining the highest indicated reading thereof during any given measurement, and zero setting means therefor.

6. A device as defined in claim 4, further including a cylindrical housing attached to said ring member and encircling said collar, bearing means, and springs.

* * * * *